May 30, 1950     A. KRESTA     2,509,770
TANK GAUGE FOR OIL AND OTHER LIQUIDS
Filed Jan. 15, 1947
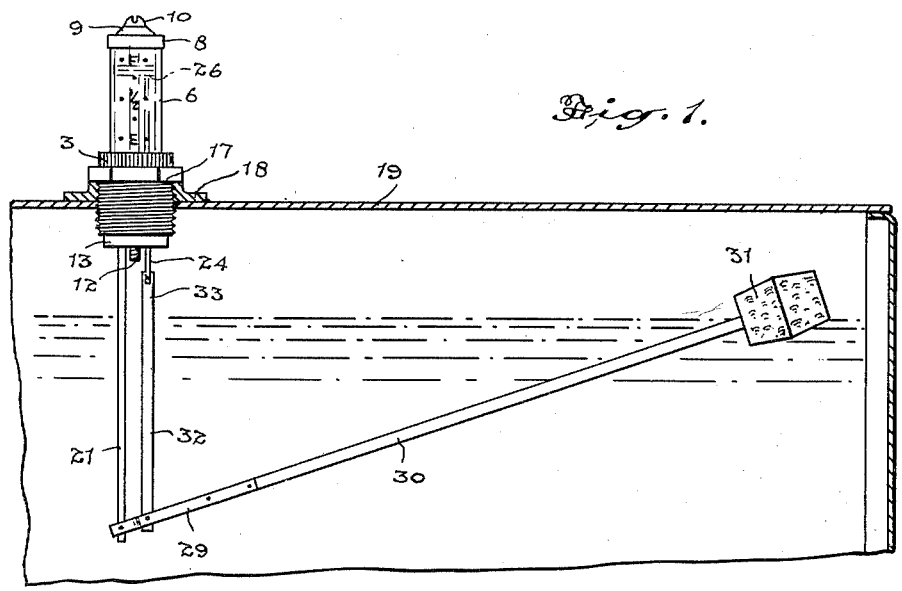
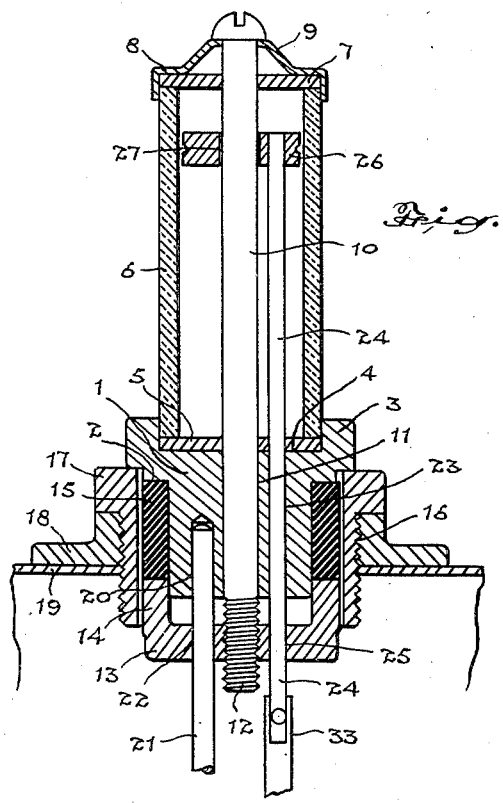
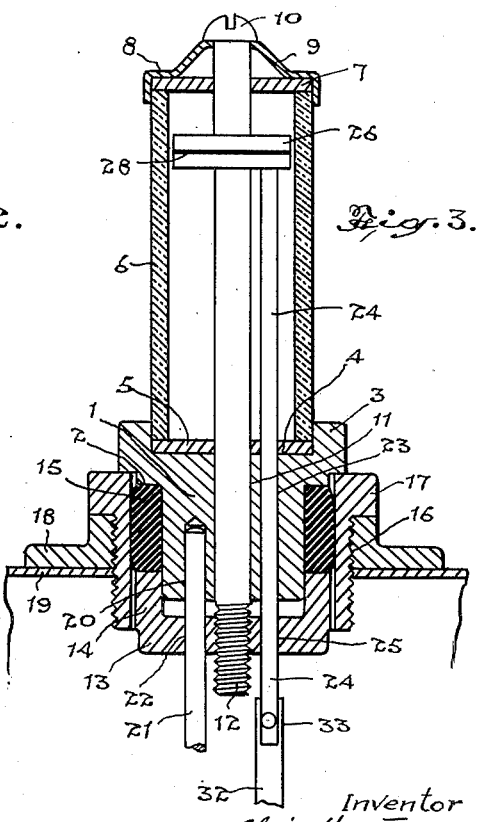
Inventor
Alois Kresta Patented May 30, 1950

2,509,770

UNITED STATES PATENT OFFICE 2,509,770

TANK GAUGE FOR OIL AND OTHER LIQUIDS

Alois Kresta, Toronto, Ontario, Canada, assignor to Prenco Progress and Engineering Corporation Limited, Toronto, Ontario, Canada Application January 15, 1947, Serial No. 722,261

5 Claims. (Cl. 73—317)

This invention relates to improvements in gauges to be applied to tanks containing liquids, which will present at all times an accurate visible indication of the quantity of liquid in the tank and the principal object of the invention is to provide a device which may be easily and quickly placed in the tank and secured with a liquid and gas-tight seal and which may be readily adjusted to locate the float in the desired position.

The principal feature of the invention consists in providing the base of the gauge member with an expansible collar adapted to be freely inserted into the bore of a nipple secured in an opening in a tank and arranging means for applying pressure to said collar to expand same to engage the walls of the tank nipple and the gauge member to form a liquid and gas-tight seal and to hold the gauge securely in an adjusted position.

In the accompanying drawings:

Figure 1 is a sectional view of a portion of a tank showing the arrangement of the improved gauge in elevation.

Figure 2 is a vertical mid-sectional view of my improved oil gauge shown inserted in the tank nipple.

Figure 3 is a view similar to Figure 2 showing the sealing collar expanded to grip and seal the tank nipple.

The form of gauge herein shown comprises a base block 1 of cylindrical form having an enlarged portion forming a shoulder 2 and a flange 3 extending beyond said shoulder.

A circular recess 4 is counterbored in the top of the base block 1 to hold a washer 5 and the bottom end of a transparent gauge tube 6 which may be of glass or other suitable material.

A washer 7 is arranged within a cap 8 which is flanged to fit over and seal the top of the tube 6, said cap being preferably formed with a frustro-conical centre 9 which is perforated with a central hole through which a bolt 10 extends downwardly through the centre of the tube and through a central hole 11 extending axially through the base 1.

Threaded on the threaded end 12 of the bolt 10 is a cup-shaped nut 13, the flange 14 of which loosely encircles the lower end of the cylindrical block 1.

Arranged between the upper edge of the flange 14 of the nut 13 and the shoulder 2 of the block 1 is a collar 15 of rubber or other suitable readily compressible material which when compressed longitudinally will expand in diameter.

The outer diameter of the collar 15 when not under compression is adapted to fit loosely within the cylindrical bore 16 of a nipple 17 which is threaded into a threaded flange 18 secured to the outer wall of the tank 19 and forming an opening thereinto.

The block 1 is formed with a hole 20 extending upwardly from the bottom and arranged offset from the central bore 11.

A rod 21 secured in the hole 20 in the block 1 extends vertically downward through a hole 22 arranged in the nut 13 and forms a sliding guide for the nut to prevent it from turning on the turning of the bolt 10.

The block 1 is provided with a vertical hole 23 arranged parallel with the centre bore 11 and diametrically opposite to the hole 20. This hole extends through the block from bottom to top and a rod 24 slidable therein extends through a hole 25 in the nut and through the block 1 into the interior of the tube 6.

A gauge disc 26 is secured on the upper end of the rod 24 and is provided with a central hole 27 through which the bolt 10 extends freely.

The periphery of the disc 26 is shown formed with a circumferential groove in which is placed a black or other coloured marker 28 which will be readily seen through the transparent tube 6.

The tube 6 has suitable gauge marks arranged on its face, either inside or outside to register with the marker 28 of the disc 26 to indicate the level of the liquid in the tank on which the gauge is mounted.

The rod 21 extends well down into the tank and upon its lower end is pivotally mounted the forked end 29 of a rod 30 upon the free end of which is secured a suitable float 31.

A link rod 32 is pivotally secured to the rod 30 at a point spaced a suitable distance from the rod 21 and it extends upwardly and its upper end 33 is pivotally connected to the lower end of the rod 24 extending below the base 1 and nut 13.

In the application of this invention the tank is provided with a collar flange 18 which is provided with a threaded opening.

A smooth bore nipple is threaded into this flange and thus provides a large opening which permits the float 31 with its jointed connecting rods to be easily inserted into the tank.

The block 1 with its compressible collar, which are connected to the rods 21 and 24, slips freely into the bore of the nipple until the flange 3 rests upon the top of the nipple.

The block 1 may be turned easily and freely to bring the laterally extending float rod 30 into its proper operating position.

When the block has been adjusted the bolt 10 is then rotated from the top and its threaded end turning in the nut 13 draws said nut upwardly to apply pressure against the lower edge of the compressible collar 15.

Application of such compression pressure causes the collar to expand laterally until its periphery engages in contact with the inner wall of the nipple 17 securing the gauge firmly in place and forming a gas and liquid seal.

It will be understood that a gauge such as described will be easily removed for repair or adjustment and again replaced by the simple operation of turning the bolt.

The construction herein described is the preferred form but it will be readily appreciated that numerous changes may be made within the scope of the invention to secure the gauge by expanding a compressible member to grip and hold it in position.

What I claim as my invention is:

1. In a tank gauge the combination with the wall of an opening in the tank, of a gauge member having a peripheral shoulder, a compressible collar surrounding said gauge member and engaging said shoulder, a member engaging said collar to compress same against said shoulder, means mounted in said gauge for operating said expanding member, and float-operated liquid level indicating means carried by said gauge member and extending through said collar-engaging member to prevent rotation of same.

2. In a tank gauge, the combination with the wall having an opening into the tank, of a gauge member having an expansible collar to fit loosely into said opening, an extension projecting from said gauge member, a float-carrying rod pivoted to said extension to extend longitudinally of said tank, a liquid level indicating means operatively connected to said float rod and extending through said gauge member, and means for expanding said collar to grip the tank.

3. In a tank gauge, the combination with the wall having an opening into the tank, of a gauge member having a peripheral shoulder, liquid level indicating float means operatively connected with said gauge member, a compressible collar surrounding said gauge member and engaging said shoulder, a flanged member loosely encircling the gauge member and having a threaded hole therein and held from rotation by said liquid level indicating means connected with said gauge member, and a bolt rotatably mounted in said gauge member and engaging said threaded hole in said flanged member to move the flange thereof into and out of compressive contact with said collar.

4. A device as claimed in claim 3 in which the float means comprises a rod rigidly secured in said gauge member and slidably extending through a hole in said flanged member to hold same from rotation, a float arm secured to said rod, and indicator means connected with said float arm and extending upwardly through said gauge member.

5. A device as claimed in claim 3 wherein a transparent tube is mounted on the shouldered member, a cover closing the top of said tube, the bolt being rotatably mounted in said cover extends through said tube and flange member, a gauge disc being slidably mounted on and guided by the bolt within the tube and operatively connected with said float means.

ALOIS KRESTA.

REFERENCES CITED

The following references are of record in the file of this patent:

UNITED STATES PATENTS

| Number | Name | Date |
|---|---|---|
| 1,623,843 | Klinck | Apr. 5, 1927 |
| 1,644,118 | Florence | Oct. 4, 1927 |
| 2,277,445 | Mele | Mar. 24, 1942 |
| 2,277,885 | Rodanet | Mar. 31, 1942 |